(12) United States Patent
Woodward

(10) Patent No.: US 6,177,533 B1
(45) Date of Patent: Jan. 23, 2001

(54) POLYTETRAFLUOROETHYLENE RESIN

(75) Inventor: Jones Clay Woodward, Washington, WV (US)

(73) Assignee: E. I. du Pont de Nemours and Company, Wilmington, DE (US)

(*) Notice: Under 35 U.S.C. 154(b), the term of this patent shall be extended for 0 days.

(21) Appl. No.: 09/408,827

(22) Filed: Sep. 29, 1999

Related U.S. Application Data

(60) Provisional application No. 60/108,427, filed on Nov. 13, 1998.

(51) Int. Cl.⁷ .................................................. C08F 114/18
(52) U.S. Cl. ........................ 526/255; 526/206; 526/250
(58) Field of Search ................................. 526/206, 250, 526/255

(56) References Cited

U.S. PATENT DOCUMENTS

| | | | |
|---|---|---|---|
| 2,230,654 | 2/1941 | Plunkett | 260/94 |
| 2,559,752 | 7/1951 | Berry | 260/29.6 |
| 2,612,484 | 9/1952 | Bankoff | 260/29.6 |
| 3,819,594 | 6/1974 | Holmes et al. | 260/87.5 A |
| 3,855,191 | 12/1974 | Doughty, Jr. et al. | 260/87.5 A |
| 4,016,345 | 4/1977 | Holmes | 526/206 |
| 4,025,481 | 5/1977 | Tournut et al. | 260/29.6 F |
| 4,098,975 | 7/1978 | Shimizu et al. | 526/73 |
| 4,159,370 | 6/1979 | Koizumi et al. | 526/73 |
| 4,186,121 | 1/1980 | Gangal | 260/29.6 F |
| 4,363,900 | 12/1982 | Shimizu et al. | 526/83 |
| 4,481,343 | 11/1984 | Herisson | 526/255 |
| 4,530,981 | 7/1985 | Malhotra | 526/73 |
| 4,576,869 | 3/1986 | Malhotra | 428/502 |
| 4,639,497 | 1/1987 | Knight et al. | 526/93 |
| 4,640,955 | 2/1987 | Malhotra | 524/546 |
| 4,654,406 | 3/1987 | Malhotra | 526/91 |
| 4,725,644 | 2/1988 | Malhotra | 524/805 |
| 4,748,217 | 5/1988 | Malhotra | 526/81 |
| 4,766,188 | 8/1988 | Attwood et al. | 526/227 |
| 4,837,267 | 6/1989 | Malhotra | 524/535 |
| 4,921,922 | 5/1990 | Attwood et al. | 526/255 |
| 5,391,709 | 2/1995 | Egres, Jr. et al. | 528/483 |
| 5,405,923 | 4/1995 | Aten | 526/73 |
| 5,470,655 | 11/1995 | Hirai | 428/364 |
| 5,763,552 | 6/1998 | Feiring et al. | 526/214 |

FOREIGN PATENT DOCUMENTS

| | | | |
|---|---|---|---|
| 1122084 | 7/1968 | (GB) | C08F/3/24 |

*Primary Examiner*—Helen L. Pezzuto

(57) ABSTRACT

Stretchable polytetrafluoroethylene resin has high break strength and/or low creep rate.

9 Claims, No Drawings

POLYTETRAFLUOROETHYLENE RESIN

RELATED APPLICATIONS

The present application claims benefit of U.S. Provisional application Ser. No. 60/108,427, filed Nov. 13, 1998.

FIELD OF THE INVENTION

This invention is in the field of non-melt-fabricable tetrafluoroethylene polymers made by dispersion polymerization.

BACKGROUND OF THE INVENTION

Tetrafluoroethylene (TFE) polymers are well known. The group of TFE polymers includes polytetrafluoroethylene (PTFE), which was originally disclosed by Plunkett in U.S. Pat. No. 2,230,654, and copolymers of TFE with such small concentrations of copolymerizable modifying monomers that the melting point of the resultant polymer is not substantially reduced below that of PTFE, e.g., no lower than 320° C. (modified PTFE). Various processes for polymerizing TFE have evolved since Plunkett's discovery.

PTFE and modified PTFE can be produced by the process known as dispersion polymerization, which typically yields an aqueous dispersion (raw dispersion) of small particles which can be coagulated and dried to obtain coagulated dispersion resin (also known in the art as fine powder) or concentrated and/or stabilized for use as a dispersion. The dispersion polymerization of TFE in an agitated aqueous medium using fluorinated surfactant (dispersant) and water-soluble initiator is well known, dating from U.S. Pat. No. 2,559,752 (Berry). The process is usually carried out in the presence of 0.1–12%, based on weight of aqueous medium, of a saturated hydrocarbon having more than 12 carbon atoms and which is liquid under polymerization conditions, as disclosed by Bankoff in U.S. Pat. No. 2,612,484. Paraffin wax is a preferred saturated hydrocarbon, which sets a lower limit on polymerization temperature for the paraffin to be present in its liquid state. Paraffin waxes commonly used for this purpose melt at about 50°–60° C., so dispersion polymerizations commonly start at temperatures above about 60° C. Such hydrocarbons act as stabilizers in the polymerization process, preventing or retarding the formation of coagulated polymer in the agitated system.

Fine powder resin, whether PTFE or modified PTFE, has high melt viscosity, e.g. a melt viscosity of at least $1 \times 10^8$ Pa·s. Such resin does not flow readily at melt temperature and, therefore, is considered to be non-melt-fabricable. Fine powder resin is commonly converted to useful articles by a lubricated extrusion (paste extrusion) process in which the resin is blended with a lubricant, the lubricated resin (paste) is shaped by an extrusion process, the lubricant is removed, and the resultant green shape is fused (sintered) at temperature above the melting point of the PTFE.

One important use of fine powder resin has been to provide paste extruded shapes that can be rapidly stretched in the unsintered state to form product that is porous to water vapor but not to condensed water, and is useful in "breathable" fabric material for garments, tenting, separatory membranes, and the like.

In practice, fine powder resin which has achieved acceptance for stretching use has been PTFE of high molecular weight. Resin for this utility is disclosed, for example, by Holmes in U.S. Pat. No. 4,016,345 which claims a process using inorganic persulfate initiator at a temperature of 95°–125° C. The '345 patent demonstrates stretching at the rate of 100%/sec. Koizumi et al. in U.S. Pat. No. 4,159,370 disclose a stretchable PTFE fine powder having molecular weight of not less than 5,000,000 and a process therefor using persulfate initiator in which the polymerization conditions are changed after initiation of polymerization. One of the alternative changes of conditions disclosed is lowering the polymerization temperature by 5°–30° C. Resins of the '370 patent examples are stretchable at 100%/sec. Shimizu & Koizumi in U.S. Pat. No. 4,363,900 disclose a dispersion polymerization process for preparing stretchable fine powder comprising incorporating into the aqueous medium at a specified point in the process a polymerization retarder, e.g., hydroquinone, to extend the polymerization time by at least 130%. This patent characterizes the PTFE fine powder of Koizumi et al. as having good stretchability but still somewhat difficult to attain uniform stretching. The '900 patent examples show stretching at 100%/sec to a draw ratio of 30 without breaks ("cuts") and with uniformity ranging from even to uneven.

Attwood & Bridges in U.S. Pat. No. 4,766,188 disclose a dispersion polymerization process for stretchable PTFE in which ammonium sulphite is added after the start of polymerization. Resin made by this process is stretched at the rate of 17%/sec, but only by 600%. "Standard Specific Gravity" values are low, but the cooling rate used is 1.5° C./min instead of the slower 1.0° C./min specified in the ASTM method, and other details of the method are not disclosed.

Malhotra advanced the art of stretchable PTFE fine powder in U.S. Pat. No. 4,576,869 and U.S. Pat. No. 4,654,406 wherein the achievements of the resins disclosed therein include uniformity of stretch of at least 75% (i.e., good stretching uniformity) for stretching by at least 1000% at stretch rates throughout the range from 10%/sec to 100%/sec at a lubricant loading of 17 wt %. The superiority of Malhotra's PTFE is signalled by its capability for uniform stretching at the very low 10%/sec rate. The superior performance of the '869 patent resin was attained by ceasing to add permanganate initiator toward the end of the batch so that the reaction slows down and the end point is at least 5% longer in comparison with a reaction in which initiator addition is continued to the end of the reaction.

Despite the success of the Malhotra resin in stretching applications, PTFE resins that will provide improved stretched product characteristics, e.g., greater strength, are desired.

SUMMARY OF THE INVENTION

This invention provides an improved polytetrafluoroethylene resin which, as fine powder, is suitable for use in stretching operations after paste extrusion. The resin has standard specific gravity of no more than 2.160 indicating high average molecular weight, high rheometer pressure of at least 25 MPa at 400:1 reduction ratio, and stress relaxation time of at least 650 seconds. The polytetrafluoroethylene resin of the invention is further characterized by superior mechanical properties, having a break strength of at least 3.0 kgf at room temperature and/or a creep rate of no more than $0.1 \text{ min}^{-1}$ at 365° C.

DETAILED DESCRIPTION

The PTFE of this invention has the general characteristics of previously-known such polymers made by dispersion polymerization processes. Such resins are non-melt-fabricable and are fibrillatable. The product of dispersion polymerization can be used as aqueous dispersion, optionally after concentrating and/or stabilizing with added surfactant as known in the art, or can be coagulated, isolated from the liquid medium, and dried. For coagulation, such methods as coagulation by vigorous agitation, optionally with added electrolyte, or by freezing and thawing, can be used. Fibrillatable resins so isolated and dried, i.e., those suitable for paste extrusion processes, are commonly known by the art term "fine powder" (or fine powder resin).

This invention provides PTFE resins which, when isolated as fine powder, are useful in post-paste-extrusion stretching operations and, surprisingly, have improved properties. The PTFE resins of the invention can be in the form of fine powder, or can be the dispersed solid component of aqueous dispersions as described above. Fundamental PTFE resin particle size in the product of dispersion polymerization, i.e., raw dispersion particle size, is generally in the range 175–350 nm, preferably 200–325 nm. The PTFE resins are non-melt-fabricable (melt viscosity at least about $10^8$ Pa·s), and are fibrillatable (paste extrudable). They have high rheometer pressure, at least 25 MPa, and preferably at least 30 MPa. Rheometer pressure can be substantially higher, e.g., as high as 65 MPa or 70 MPa or even higher. The PTFE resins also have long stress relaxation time, measured as described hereinafter. Stress relaxation time is at least about 650 sec, preferably at least 675 sec, and more preferably at least 700 sec. As shown by examples to follow, stress relaxation time appears not to vary systematically with rheometer pressure at the high rheometer pressure that characterizes the PTFE resins of the invention. Average molecular weight (MW) is high as indicated by standard specific gravity (SSG) measurement, a measurement in which SSG decreases with increasing MW. SSG values are no more than about 2.160, preferably no more than 2.157. However, a low value in a test such as SSG does not necessarily predict good stretchability because it reflects an average property, and may not reflect fundamental particle structural characteristics that result in good stretching or stretched product properties. Moreover, SSG becomes so insensitive to MW variations at the very high MW (low SSG) of such PTFE that variations in the SSG procedures from laboratory to laboratory can lead to misleading results. Thus, the improved PTFE resins of the present invention are further characterized by other properties.

In one embodiment, the improved PTFE resin of the invention is characterized by surprisingly high break strength, measured as described hereinafter. Break strength is at least about 3.0 kgf (6.6 lbf), and is preferably at least 3.1 kgf.

Alternatively or additionally, the improved PTFE resin of the present invention is characterized by a surprisingly low creep rate, measured as described hereinafter. Creep rate of this form of the improved PTFE resin is no more than about 0.1 $min^{-1}$, is preferably no more than 0.08 $min^{-1}$, and is more preferably no more than 0.07 $min^{-1}$.

In an especially preferred embodiment, the PTFE resin of the present invention is characterized by break strength of at least about 3.0 kgf and a creep rate of no more than about 0.1 $min^{-1}$.

The PTFE of the present invention can be made by dispersion polymerization, which can yield fibrillatable PTFE as is known in the art. A typical dispersion polymerization process as known in the art involves the steps of precharging a liquid medium to a stirred autoclave, precharging small amounts of other ingredients including paraffin wax, deoxygenating, pressurizing with TFE to predetermined level, agitating, bringing the system to desired temperature, e.g., 60°–100° C., introducing initiator, adding more TFE according to predetermined basis, and regulating temperature. Initiator addition, at the same or different rate, may continue throughout the batch or only for part of the batch. The dispersion process for polymerization of TFE is typically conducted in aqueous medium. Water is convenient, liquid over a broad temperature range, essentially non-telogenic when impurities are reduced to low level, inexpensive, and safe. Recipe and operating parameters not fixed by the equipment are commonly selected in order that temperature is maintained approximately constant throughout the polymerization.

The improved PTFE of the present invention can be made by a dispersion polymerization process similar to TFE dispersion polymerizations known in the art, except for the temperature profile and/or the programmed presence of liquid stabilizer. In this process, the temperature starts at a lower value and increases to a higher value as polymerization progresses, with liquid stabilizer present during at least part of the time at the higher temperature. Preferably, liquid stabilizer is not present at the lower starting temperature. As shown by examples to follow, PTFE made by this process can have high strength and low creep rate as measured on stretched samples.

A process that can be used for this invention is characterized in one respect by starting TFE polymerization at low temperature, raising the temperature to higher temperature after polymerization is started, and substantially completing polymerization at higher temperature. Polymerization "starting temperature" is considered to be the measured temperature at the time that initiator is first introduced. As used herein, polymerization "starting stage" means a time interval characterized by some process condition(s) and during which the start of polymerization occurs. Polymerization starting time is likewise taken herein as the time that initiator is first introduced, recognizing that discernible signals of the onset of the polymerization reaction may occur somewhat later. For example, a pressure drop indicating TFE consumption may occur before the end of a first initiator addition period. Nevertheless, the start of the first initiator addition is used herein as the starting time, and reported batch times and times to certain temperatures are measured from that point. Preferably, the starting temperature is no more than 60° C., more preferably no more than 55° C., and most preferably no more than 50° C. Since an aqueous medium is used, polymerization starting temperature must be high enough that the water is in the liquid state, considering the effect of dissolved ingredients and operating pressure on freezing point. Further, the polymerization starting temperature should be high enough that initiators of choice are effective in generating initiating radicals. Desirably, starting temperature is at least about 20° C., preferably at least about 33° C. If polymerization is started at a temperature below 33° C., the critical temperature for TFE, the pressure desirably should be low enough to avoid the presence of liquefied TFE and the potential safety issues associated therewith.

After polymerization is started, the temperature is increased by at least 5° C., preferably by at least 10° C., to a temperature in the approximate range 60°–100° C., preferably 65°–85° C. and is substantially completed at such higher temperature, herein sometimes called "completing temperature". One skilled in the art will recognize the possibilities of more than one temperature within the low-temperature (up to 55° C. or 5° C. above starting temperature) and the high-temperature (above 55° C. or 5° C. above starting temperature) stages, and of various continuously varying temperature profiles within each stage.

Usually, the temperature generally increases during the low-temperature stage and is held nominally constant after reaching the completing temperature in the high-temperature stage of polymerization. There is considerable latitude with respect to the length of the low-temperature stage of polymerization, in the sense that there is no minimum length other than a time sufficient to initiate polymerization. Thus, the low-temperature stage could end as soon as polymerization starts, though some finite time is required for temperature to increase to the end of the low-temperature stage. Heat may be applied to assist in increasing temperature. However, the polymerization of TFE is an exothermic process. In one mode of executing this process, it is convenient to allow the heat of reaction to cause the temperature to increase to some predetermined point, or to increase for some predetermined time before the start of applied heating to increase temperature to that value desired for the high temperature stage. Cooling may be employed to control the rate of temperature change caused by the heat of reaction.

Commonly, the length of the low-temperature stage is a time interval measured in minutes, e.g., 5 min or 10 min or 30 min. Generally, it is desired for the low-temperature stage to be relatively short compared with the total length of the polymerization, so that a substantial part, e.g., at least 35%, of the polymerization is carried out at the higher (completing) temperature. Usually, for example, the length of the low-temperature stage is no more than 45% of the total length of the polymerization, preferably no more than 35%, and most preferably no more than 25% of the total length of the polymerization. The length of the low-temperature stage is measured from polymerization starting time to the time at which the temperature reaches 55° C. or has increased by at least 5° C. if the temperature of the low-temperature stage is greater than 50° C. It is desired that at least about 40% of PTFE formed during the batch is formed at a temperature of at least 55° C. (at least 5° C. above the temperature of the low-temperature stage if the temperature of the low-temperature stage is greater than 50° C.), preferably at least 50%, and most preferably at least 60%. Even more preferably, these fractions of total PTFE formed are formed at about 65° C. or above. As discussed below, the completing of the batch is carried out in the presence of liquid stabilizer.

The transition from the low-temperature stage to the high-temperature stage can be in any convenient way. For example, the temperature can be increased linearly, or in steps, or according to any program desired. Practically, because of the heat capacity of the aqueous medium, and the heating and heat transfer capabilities of the polymerization system, some finite time will be used to change the temperature. This time, of course, will also depend on the difference between the chosen low temperature and the chosen high temperature. Generally, it is desirable for the temperature change to be made quickly, e.g., in a time short with respect to the total length of the batch, such as no more than 20% of the total polymerization time. The temperature change can be achieved by heating as rapidly as possible, such as by applying heat to the reactor jacket in combination with the heat of reaction. Controlled (programmed) rapid temperature change profiles can also be used to change temperature between the low-temperature stage and the high-temperature stage. Normally, polymerization continues as temperature is increased above the starting temperature and from the low-temperature stage to the high-temperature stage.

A process that can be used to make the PTFE of the present invention is characterized by completing TFE polymerization in the presence of liquid stabilizer. Preferred stabilizers include saturated hydrocarbons having more than 12 carbon atoms. Paraffin wax is a preferred saturated hydrocarbon, and preferred paraffin waxes usually have melting temperatures of about 50°–60° C., more preferably 52°–58° C. If liquid stabilizer is present during the low-temperature stage, of course, the stabilizer must have a melting temperature below the process temperature for that stage. In general, however, candidate stabilizers that are sufficiently insoluble in water and have suitable purity, so as not to impair TFE polymerization, and are available at reasonable cost have relatively high melting temperatures, such as greater than 50° C. Thus, it is preferable to carry out the low-temperature stage of polymerization in the absence of liquid stabilizer.

The presence of liquid stabilizer during the completion of TFE polymerization can be accomplished in various ways. For those embodiments of the process in which liquid stabilizer is not present at the start of TFE polymerization, there are several alternatives for having liquid stabilizer present during completion of polymerization. Such alternatives include, for example, the addition of stabilizer to the polymerization vessel as a liquid during the polymerization process. For example, paraffin wax (liquid) can be pumped into the reactor at the desired point in the process. In this alternative, the liquid stabilizer is preferably at a temperature close to that of the polymerization medium at the time of stabilizer introduction. Alternatives also include the introduction of stabilizer in the solid state into the polymerization vessel prior to the start of polymerization, with the stabilizer subsequently being liquefied by increasing the temperature of the reactor and its contents above the melting temperature of the stabilizer. A variant of this alternative is to introduce the stabilizer in the solid state, melt the stabilizer by increasing temperature, and subsequently solidify the stabilizer by reducing the temperature below the melting point of the stabilizer before polymerization is started. Another variant is to introduce the stabilizer in the liquid state as part of the precharge to the vessel, and subsequently solidify the stabilizer by reducing the temperature below the melting point of the stabilizer before polymerization is started. When the process has both low- and high-temperature stages ("temperature stages") and stages with liquid stabilizer both absent and present ("stabilizer stages"), the breaks between the temperature stages and the stabilizer stages may or may not coincide. E.g., a solid stabilizer might melt during the transition between temperature stages, in which case the breaks would coincide, or a liquid stabilizer could be introduced after the transition between temperature stages, in which case the breaks would not coincide.

When liquid stabilizer, e.g., liquid saturated hydrocarbon, is present, the amount employed is usually in the range 0.1–12%, more commonly in the range 1–8%, by weight based on the weight of water charged to the polymerization reactor.

Any workable pressure can be used in the process. High pressure offers an advantage over low pressure in increased reaction rate. However, the polymerization of TFE is highly exothermic, so high reaction rate increases the heat that must be removed or accommodated. Pressures that can be used are also determined by equipment design and by safety concerns in the handling of TFE. Generally, pressures in the range of about 0.3–7 MPa are known for dispersion polymerization of TFE, and pressures in the range 0.7–3.5 MPa are common. While it is common to maintain constant TFE pressure, pressure can be varied.

Initiators that can be used include free radical initiators that are effective over the temperature range to be employed.

For the process in which polymerization starts at low temperature, the initiator should generate radicals at adequate rate at low temperature. Suitable initiators include, for example, potassium permanganate systems, and various other redox systems such as ammonium persulfate/bisulfite/iron sulfate, manganese triacetate/oxalic acid, ceric ammonium nitrate/oxalic acid, or bromate/bisulfite.

For TFE polymerization to PTFE of the present invention, preferred initiators have short half life. The half life of an initiator, as known to those skilled in the art, is the time required for half of a sample of initiator to produce free radicals under conditions of interest. The time scale on which the half life of an initiator is judged to be short or long is the polymerization time (batch time). Preferably, initiator half life is less than 20% of batch time more preferably less than 10%, and most preferably less than 5% of batch time. As known to the art, batch time for dispersion polymerization of TFE can vary widely depending on temperature, pressure, initiator activity, and so on. For polymerizations having batch times of less than about 300 min, as illustrated by some of the following examples of the present invention, initiator half life is preferably less than 10 min, more preferably less than 5 min, and most preferably less than 2 min at 80° C. Such initiators include redox initiators such as manganese triacetate/oxalic acid. Preferred redox initiators include those of which the permanganate ion is a component, e.g., potassium permanganate/oxalic acid. Other reducers that can be used in redox systems with permanganates include FeII and MnII salts and sodium bisulfite. Initiator having half life of less than 10 min, of course, can be used for polymerizations of TFE that are longer than the polymerizations exemplified herein.

Since initiator concentration influences the polymerization product, the amount of initiator used is that which is effective to obtain the intended result, and, as known to one skilled in the art, will also depend on the efficiency of the initiator. Preferably, the amount of initiator used is in the range of 0.1–200 ppm, more preferably 0.5–100 ppm, based on the weight of polymer formed (measurable as TFE monomer consumed).

Other ingredients can be used in polymerizing the PTFE of this invention. Such other ingredients include, for example, surfactants, additives to minimize formation of autoclave adhesions, color inhibitors, and the like as known to one skilled in the art. Additives to reduce the amount of coagulum formed during the polymerization include, for example, the selected carboxylic acids disclosed by Gangal in U.S. Pat. No. 4,186,121. Such other ingredients are usually, but not necessarily, introduced into the autoclave as part of the precharge.

A preferred process for the polymerization of TFE to make the PTFE of this invention is carried out in the presence of water soluble initiator. "The presence of initiator" is to be interpreted to mean that initiator that can produce radicals, but has not yet done so, is present at some time during the polymerization. However, the amount of initiator present at different times during polymerization can vary. It is preferred to use an initiator having short half life as discussed above, and to add such initiator at the beginning and through the early part of the polymerization, but not to add initiator toward the end of the polymerization. Preferably, the rate of initiator addition is uniform during a given stage of polymerization (which need not coincide with a temperature stage or a stabilizer stage discussed above). However, one skilled in the art will appreciate that other initiator addition programs can be employed. Preferably, to make PTFE of the invention, no such initiator is added during the last 35% of the polymerization, more preferably during the last 45%, most preferably during the last 55% of the polymerization as measured by TFE consumed during the polymerization.

The agitator speed in the autoclave is chosen to rapidly disperse the TFE (and other monomers if present) into the aqueous phase, but not to unduly shear the polymer dispersion being formed which can cause coagulum. Provided that sufficient active initiator is present, the rate of the polymerization is dependent on the agitator speed in the early part of the polymerization and an agitator speed can be chosen which is as high as practicable. If sufficient active initiator is not present, such as where a short half-life initiator is used and its addition is ceased toward the end of the polymerization causing polymerization to slow, the agitation speed does not substantially influence the rate of the reaction and agitation speed can be lowered to minimize coagulum formation.

Substantially non-telogenic anionic surfactants (dispersing agents) are commonly used in dispersion polymerization of TFE. Preferred dispersing agents include perfluoroalkanoic acids having 7–20 carbon atoms, preferably 8–10 carbon atoms, and certain salts thereof, especially ammonium salts. The amount of dispersing agent present, when used, is ordinarily between about 500 ppm and about 5000 ppm based on the weight of water present, and is insufficient to cause formation of colloidal particles.

EXAMPLES

Unless otherwise specified, solution concentrations are stated in wt % based on combined weights of solute and solvent water.

For experiments described below in which initiator is not added throughout the batch, "core time" is the polymerization time measured from the start of initiator addition to the stopping of initiator addition and "core TFE" is the amount of TFE consumed during core time.

Raw Dispersion Properties:

Solids content of PTFE raw (as polymerized) dispersion are determined gravimetrically by evaporating a weighed aliquot of dispersion to dryness, and weighing the dried solids. Solids content is stated in wt % based on combined weights of PTFE and water. Raw dispersion particle size (RDPS) is measured by photon correlation spectroscopy.

Resin Properties:

Standard specific gravity (SSG) of PTFE fine powder resin is measured by the method of ASTM D-4895. Melt viscosity (MV) is measured at 380° C. by a modification of the tensile creep method disclosed in U.S. Pat. No. 3,819,594, with the mold at room temperature, using a molding pressure of 200 kg/cm$^2$ (19.6 MPa), with the molding pressure held for 2 min, using a load (total weight suspended from the sample sliver) that varies with the MV to obtain a creep rate suitable for measurement, and waiting at least 30 min after application of the load for elastic response to be complete before selecting viscous response (creep) data for use in the calculation. Rheometer pressure (extrusion pressure) is measured by the method of ASTM D-4895 Section 10.8 using 18.4 wt % Isopar® G (Exxon) lubricant and a reduction ratio of 400:1.

Stretch Procedure:

A sample of the fine powder resin is screened through a 2000 μm sieve. This resin (113.4 g) is admixed with 17.7 wt %, based on combined weight of resin and lubricant, of Isopar® K (Exxon) lubricant at room temperature in a glass jar of 8.25 cm inside diameter. The jar is closed and is then is turned for 3 min on a vertically-disposed mixing wheel (horizontal axis) revolving at 14 rpm. The sample jar is then placed in a 22° C. water bath for as least 2 hr before extruding. The lubricated resin is paste extruded at a reduction ratio of 100:1 at room temperature through an orifice (2.4 mm diameter, 5 mm land length, 30° entrance angle) into a uniform beading. The extrusion speed, i.e., ram speed, is 20 inch/min (51 cm/min). The lubricant is removed from the beading by heating at 230° C. for 30 min. A length of beading is cut and clamped at each end leaving a space of either 1.5 inch (38 mm) or 2.0 inch (51 mm) between clamps, depending on the purpose of the procedure, and heated to 300° C. in a circulating air oven. The clamps are then moved apart at the desired rate to a separation corresponding to the desired total stretch, and the specimen is examined for integrity. This Stretch Procedure essentially follows a method disclosed in U.S. Pat. No. 4,576,869 except that the extrusion speed is different (51 cm/min rather than 84 cm/min). "Stretch" is the increase in length, normally expressed relative to original length.

Stress Relaxation Time:

The specimen for the Stress Relaxation Time test measurement is made by stretching a beading, as in Stretch Procedure using 1.5 inch between clamps, at a stretch rate of 1000%/sec to a total stretch of 2400%. Both ends of a sample of this beading are tied to a fixture so that there is a taut 8-inch (15-cm) span of beading. Stress relaxation time is the time it takes for this specimen to break after it is placed in an oven at 390° C., i.e., a temperature above the 380° C. melting of the extended chain configuration disclosed in U.S. Pat. No. 5,470,655. The specimen in its fixture is inserted into the oven through a (covered) slot in the side of the oven, so that the temperature does not drop during placement of the specimen and hence does not require a minute to recover as disclosed in U.S. Pat. No. 4,576,869.

Break Strength:

The specimen for Break Strength test measurement is made by stretching a beading, as in Stretch Procedure using 2.0 inch between clamps, at a stretch rate of 100%/sec to a total stretch of 2400%. The break strength is taken as the minimum tensile break load (force) of three specimens taken from the stretched beading, one from each stretched end of the beading (excluding neck-down if any in the region of the clamp) and one from the center thereof. The measurement is made at room temperature using an Instron® tensile tester, clamping the specimen in the jaws with a 2 inch (5.1 cm) gage length, and driving the moving jaw at a speed of 1 ft/min (30.5 cm/sec).

Creep Rate:

This test is designed to measure the tensile creep at a temperature of 365° C., i.e., a temperature above the melting point of the as-polymerized resin but below the 380° C. melting of the extended chain configuration disclosed in U.S. Pat. No. 5,470,655. The chamber used to provide the constant 365° C. temperature is a melt index apparatus without orifice or retaining nut but which conforms to ASTM standard dimensions. The temperature is defined by a thermometer accurate to ±1° C. inserted into the top of the indexer cavity such that the bulb end is 3.5 inch (8.9 cm) from the top of the cavity, and a collar is placed around the thermometer to serve as a barrier to air flow through the cavity. The specimen for Creep Rate measurement is made by stretching a beading, as in Stretch Procedure using 1.5 inch between clamps, at a stretch rate of 1000%/sec to a total stretch of 2400%. A sample of stretched beading is tied between two glass rods having hooks at each end, such that the length of beading that can be stretched under tension is one inch (2.5 cm). One (the upper) rod is one inch (2.5 cm) long and about 0.03 inch (0.8 mm) in diameter. The other (the lower) rod is 6 inch (15.2 cm) long, 0.188 inch (4.76 mm) in diameter, and weighs 6±0.5 g. The rod and beading assembly is inserted into the cavity of the melt indexer, such that the top of the beading is approximately 1.25 inch (3.2 cm) below the top of the cavity and the longer rod extends out of the bottom of the apparatus. The mass of the lower rod keeps the sample from retracting quickly while the specimen heats to the test temperature and before a heavier weight (below) is attached. The upper rod is hung from a small PTFE ring which also serves to impede air flow up through the heated chamber. Then, as quickly as possible, a weight of 52 g is hung from the hook on the lower rod. The weight is made from 0.375-inch (9.5-mm) square steel rod stock 3.125 inch (7.9 cm) long, and on the top end has an eyelet attached to a swivel for hanging the weight from the lower glass rod. On one side are machined 10 transverse square notches 0.125 inch (3.18 mm) wide and deep, separated by lands of 0.125 inch width. The tops of lands (the 0.125 by 3.125 inch surfaces) are polished. An SSG specimen (above) is mounted with its flat surfaces in a vertical plane and the cylindrical surface just barely touching the weight, thereby serving as a PTFE bearing to guide the weight and keep it in a desired orientation. A photoelectric sensor with integral light source (model PS2-61/PS-47, Keyence Corporation of America) is mounted facing the surface of the weight containing the polished tops of the lands. The test is started with the light beam directed at the lower edge of the lowest notch, and the signal from the sensor is recorded on a GC (gas chromatograph) integrator as a function of time as the weight drops past the sensor. A significant signal is obtained when the beam of light is incident on a polished land, and no signal (or low signal) when incident on a notch. The light beam is focused to small point, so the GC integrator trace is very nearly a square wave. The test signal is usually recorded beginning at a strain ($\Delta L/L_0$) of 0.125 and continuing to a strain of 2.5, where $\Delta L$ is the change of length and $L_0$ is the initial length of sample (i.e., one inch). The slope of strain vs. time over the strain range from 0.625 to 1.5 is calculated by a least squares method to obtain the strain rate in units of $min^{-1}$, which is reported herein as tenile creep rate or merely creep rate.

Comparative Example A

Comparative Example A illustrates the polymerization of TFE to make a high molecular weight PTFE resin suitable for stretching after paste extrusion following the procedure of Example 1 of Malhotra in U.S. Pat. No. 4,576,869 using discrete additions of permanganate polymerization initiator. A polykettle having a horizontal agitator and a water capacity of 100 parts by weight is charged with 57.5 parts of demineralized water, 1.62 parts of paraffin wax, 0.21 part of a 20 wt % solution of ammonium perfluorooctanoate (C-8) dispersant, 0.0135 part of a 2 wt % oxalic acid solution, and 0.0067 part of succinic acid. The contents of the polykettle are heated to 75° C., evacuated and purged with nitrogen. The contents of the polykettle are agitated at 76 rpm. The temperature is increased to 80° C. TFE is then added until the pressure was 2.75 MPa. Then, 0.73 part of a fresh initiator solution of 0.0005 part of $KMnO_4$ per part of water is added at the rate of 0.27 part/min. Once 2.5 parts of TFE have reacted, 2.7 parts of a 4.5 wt % C-8 solution is added at a rate of 0.135 parts/min. Three more additions of 0.175 parts of the $KMnO_4$ solution are added at 10 minute intervals after kickoff. The total $KMnO_4$ added is 1.25 parts of the solution. No $KMnO_4$ is added after 49.8% of the TFE has been added. The agitation rate is reduced to 46 rpm after 92.5% of the TFE is added, 95 minutes after kickoff, without influencing the rate of polymerization. The initial rate of the reaction is 25.2 parts of TFE/min. If the reaction is not slowed, completion is expected in about 60 minutes. However, the reaction slows noticeably after 40 minutes so that 37.94 parts of TFE are consumed in 161 minutes which is 168% longer than if the reaction does not slow. Such a slow down is even greater than the slow down cited by Malhotra. After the TFE feed is stopped the polykettle is vented, evacuated, and purged with nitrogen. The contents are discharged from the polykettle and the supernatant wax is removed. Solids content of the raw dispersion is 42.5% and the RDPS is 283 nm. The dispersion is diluted to 11% solids and coagulated in the presence of ammonium carbonate under vigorous agitation conditions. The coagulated dispersion (fine powder) is separated from the liquid and dried at 150° C. for three days. The PTFE resin has MV of $2.3 \times 10^{10}$ Pa·s, SSG of 2.1649 and rheometer pressure of 41.7 MPa. However, the stress relaxation time is only 550 sec. and the break strength is only 2.4 kgf while the creep rate of 0.20 $min^{-1}$ is high.

Comparative Example B

Comparative Example B illustrates the polymerization of TFE to make a high molecular weight PTFE resin suitable for stretching after paste extrusion following the procedure of Example 3 of Malhotra in U.S. Pat. No. 4,654,406 using discrete additions of a Ce(IV) salt polymerization initiator system. A polykettle having a horizontal agitator and a water capacity of 100 parts by weight is charged with 52.6 parts of demineralized water, 1.62 parts of paraffin wax, 0.21 part of a 20 wt % solution of ammonium perfluorooctanoate (C-8) dispersant, 0.004 part of oxalic acid, and 0.027 part of succinic acid. The contents of the polykettle are heated to 70° C., evacuated and purged with nitrogen. The contents of the polykettle are agitated at 46 rpm. The temperature is held at 70° C. TFE is then added until the pressure is 2.75 MPa. Then, 0.27 part of a fresh initiator solution of 0.004 part of $Ce(NH_4)_2(NO_3)_6$ per part of water is added at a rate of 0.027 part/min. Once 2.5 parts of TFE have reacted, 2.7 parts of a 4.5 wt % C-8 solution is added at a rate of 0.135 parts/min. The rate of reaction slows after 50 minutes from kickoff. The agitation rate is reduced to 35 rpm after 96% of the TFE is added, 134 minutes after kickoff, without influencing the rate of polymerization. After 149 minutes has elapsed from kickoff, 31.8 parts of TFE has been added. If the reaction is not slowed, completion is expected in 115 minutes. However, the reaction slows noticeably and the reaction is 30% longer than if the reaction does not slow down. The polymerization rate for the final 30 minutes of polymerization is 0.0022 parts of TFE per part of water. This rate is similar to the 0.0027 cited by Malhotra. The total reaction time is 149 minutes. After the TFE feed is stopped the polykettle is vented, evacuated, and purged with nitrogen. The contents are discharged from the polykettle and the supernatant wax is removed. Solids content of the raw dispersion is 40% and the RDPS is 324 nm. The dispersion is diluted to 11% solids and coagulated in the presence of ammonium carbonate under vigorous agitation conditions. The coagulated dispersion (fine powder) is separated from the liquid and dried at 150° C. for three days. The PTFE resin has MV of $3.2 \times 10^{10}$ Pa·s, SSG of 2.1590, rheometer pressure of 36.2 MPa, and a stress relaxation time of 745 sec. However, the break strength is only 2.22 kgf and the creep rate of 0.59 $min^{-1}$ is high.

Comparative Example C

This Comparative Example illustrates the polymerization of TFE to make a high molecular weight PTFE resin suitable for stretching after paste extrusion combining the use of permanganate as demonstrated by Malhotra in U.S. Pat. No. 4,576,869 but using the technique of continuous pumping of initiator. A polykettle having a horizontal agitator and a water capacity of 100 parts by weight is charged with 51.6 parts of demineralized water, 1.62 parts of paraffin wax, 0.16 part of a 20 wt % solution of ammonium perfluorooctanoate (C-8) dispersant, 0.027 part of a 2 wt % oxalic acid solution, and 0.0027 part of succinic acid. The contents of the polykettle are heated to 65° C., and the polykettle is evacuated and purged with TFE. The contents of the polykettle are agitated at 46 rpm. The temperature is increased to 80° C. TFE is then added until the pressure was 2.75 MPa. Then, 0.65 part of a fresh initiator solution of 0.00015 part of $KMnO_4$ and 0.00007 part of ammonium phosphate per part of water are added at the rate of 0.22 part/min. When this addition is complete, a 3.2 wt % C-8 solution is added at the rate of 0.022 part/min to the end of the batch and additional initiator solution is added at the rate of 0.014 part/min. TFE is added at a rate sufficient to maintain the pressure at 2.75 MPa. After 18.4 parts of TFE have been added following initial pressurizing with TFE, initiator solution addition is stopped. The polymerization time to the stopping of initiator addition ("core time") is 57 min. After 33.3 parts of TFE have been added, the TFE and the C-8 solution feeds are stopped and the polykettle is vented. The length of the reaction, measured from the start of the first initiator injection to the termination of TFE feed, is 183 min. The contents are discharged from the polykettle and the supernatant wax is removed. Solids content of the raw dispersion is 39.3 wt % and RDPS is 289 nm. The dispersion is diluted to 11% solids and coagulated in the presence of ammonium carbonate under vigorous agitation conditions. The coagulated dispersion (fine powder) is separated from the liquid and dried at 150° C. for three days. The PTFE resin has MV of $2.6 \times 10^{10}$ Pa·s, SSG of 2.159, rheometer pressure of 47.2 MPa, and stress relaxation time of 751 sec. However, break strength is only 2.54 kgf and creep rate of 0.287 $min^{-1}$ is high.

Example 1

The polykettle used in Comparative Examples A–C is charged with 51.6 parts of demineralized water, 1.62 parts of paraffin wax, 0.24 part of a 20 wt % solution of C-8, 0.027 part of a 2 wt % oxalic acid solution, and 0.0027 part of succinic acid. The contents of the polykettle are heated to 55° C. then cooled to 50° C. while agitating at 25 rpm. The polykettle is evacuated, and purged with TFE. With the temperature at 50° C., the agitator speed is increased to 46 rpm. TFE is then added until the pressure is 2.75 MPa. Then, 0.65 part of a fresh initiator solution of 0.00015 part of $KMnO_4$ and 0.00007 part of ammonium phosphate per part of water are added at the rate of 0.22 part/min (3 min addition time). When this addition is complete, a 3.2 wt % C-8 solution is added at the rate of 0.022 part/min to the end of the batch and additional initiator solution is simultaneously added at the rate of 0.014 part/min. TFE is added at a rate sufficient to maintain the pressure at 2.75 MPa. With cooling applied to the reactor, the heat of reaction increases the temperature to 55° C. in about 10 min after the start of initiator addition. When 10 min have elapsed after the end of the first initiator addition, the polykettle is heated as rapidly as possible so that the temperature reaches 80° C. after approximately 18 min have elapsed after the start of initiator addition. The temperature is then maintained at 80° C. for the remainder of the batch. After 12.3 parts of TFE have been added following initial pressurizing with TFE, the initiator solution addition is stopped. After 36.8 parts of TFE have been added, the TFE feed, the C-8 solution feed and the agitator are stopped, and the polykettle is vented. The length of the reaction is 152 min. The contents are discharged from the polykettle and the supernatant wax is removed. Solids content of the raw dispersion is 44.1 wt % and RDPS is 270 nm. The dispersion is diluted to 11% solids and coagulated in the presence of ammonium carbonate under high agitation conditions. The coagulated fine powder is separated and dried at 150° C. for three days. The polymer properties are given in Table 1 and show higher break strength and lower creep rate than obtained in Comparative Examples A–C in spite of reduced batch time.

TABLE 1

Data for Examples 1–4

| Conditions & Results | 1 | 2 | 3 | 4 |
|---|---|---|---|---|
| Polymerization: | | | | |
| Starting T (° C.) | 50 | 40 | 40 | 33 |
| Completing T (° C.) | 80 | 80 | 60 | 80 |
| Time to 55° C. (min) | 10 | 20 | 20 | 12 |
| Time to comp. T (min) | 18 | 28 | 23 | 28 |
| Core TFE (part) | 12.3 | 11.0 | 12.3 | 1190 |
| Core time (min) | 33 | 34 | 45 | 26 |
| Batch time (min) | 152 | 326 | 323 | 95 |
| Total TFE (part) | 36.8 | 36.8 | 30.7 | 3400 |
| Properties: | | | | |
| RDPS (nm) | 270 | 249 | 236 | 250 |
| MV ($10^{10}$ Pa · s) | 3.6 | — | — | 7.2 |
| SSG | 2.154 | 2.155 | 2.153 | 2.153 |
| Rheometer p (MPa) | 54.3 | 65.3 | 62.3 | 35.6 |
| Break strength (kgf) | 3.25 | 3.23 | 3.18 | 3.18 |
| Stress relax. t (sec) | 723 | 702 | 716 | 718 |
| Creep rate ($min^{-1}$) | 0.078 | 0.076 | 0.072 | 0.048 |

Comparative Example D

Comparative Example D is run in the same polykettle and in the same manner as Example 1 except that the starting temperature is 40° C. and the 0.022 part/min C-8 solution addition is stopped after 234 min. However, this run is made after seven consecutive polymerizations are made using starting conditions that are essentially identical to those of Comparative Example C, which in turn are made after batches in which a terpene polymerization inhibitor is introduced into the autoclave. Terpenes are known as powerful radical scavengers and as telogens which, when present in TFE polymerization, cause slow reactions and production of comparatively low molecular weight polymer. The terpene is volatile enough to contaminate surfaces which can only be reached by exceptional procedures, e.g., by disassembly of piping, is not removed by normal cleaning procedures, and is only slowly consumed by repetitive batches free from recipe terpene. Core TFE is 12.3 parts, core time is 36 min, the total reaction time for the 36.8 parts of TFE is 253 min, and RDPS is 252 nm. The coagulated and dried fine powder has SSG of 2.154, rheometer pressure of 59.3 MPa, and stress relaxation time of 644 sec. Break strength of 2.79 kgf is low and creep rate of 0.224 $min^{-1}$ is high. Although SSG is low at 2.154, residual terpene apparently prevents attainment of the break strength or creep rate of the PTFE of the present invention. This illustrates that SSG alone is inadequate to characterize the PTFE of the invention.

Example 2

Example 2 is run in essentially the same manner as Comparative Example D but after nine intervening batches in the same polykettle, except that only 11.0 parts of TFE are fed before the initiator feed is stopped and the 0.022 part/min C-8 solution addition is stopped after 216 min. This has the effect of increasing batch time. Break strength is high and creep rate is low, as shown in Table 1.

Example 3

The polymerization of this Example 3 is carried out essentially according to the procedure of Comparative Example D, and subsequent to Example 2, except that the completing temperature is 60° C., the 0.022 part/min C-8 solution addition is stopped after 215 min, and the batch is terminated at 30.7 parts of TFE total. As indicated in Table 1, the core time is longer than in Examples 1–2. Although the shortened batch gives only 18.4 parts of TFE for the shell portion of the batch (portion of polymerization after initiator feed is stopped) resin properties are comparable to those of Example 2.

Example 4

A polymerization similar to that of Example 1 is carried out in a polykettle having a water capacity of 8125 parts. The polykettle is cleaned and charged with 4088 parts of hot water to bring the temperature to about 90° C., and 172 parts of molten wax at about 70° C. are added. After nitrogen purge and evacuation, the temperature is raised to 103° C. and the polykettle is evacuated for 1 min. Then, 3.1 parts of a 20 wt % solution of C-8, 0.038 part of oxalic acid, and 0.8 part of succinic acid in 62.8 parts of water are added. With the agitator running, the contents are cooled to 33° C. concurrent with TFE addition until the pressure is 2.75 MPa. TFE is subsequently added at a rate sufficient to maintain the pressure at 2.75 MPa throughout the batch. Then, 62.4 parts of an initiator solution of 0.000063 part of $KMnO_4$ and 0.000029 part of ammonium phosphate per part of water are added at the rate of 10.4 part/min. After 6 min, the rate of initiator solution addition is reduced to 3.3 part/min for an additional 20 min. After 144 parts of TFE have been added following initial pressuring, a solution of 1.86 part of C-8 and 0.0054 part of oxalic acid in 212 parts of water is added at the rate of 4.1 part/min. TFE consumption at the end of the 26-minute initiator addition period is 1190 parts (core TFE). The heat of reaction increases the temperature to 55° C. in about 12 min after the start of initiator addition and to about 80° C. after approximately 28 min have elapsed after the start of initiator addition, with cooling water applied to the reactor jacket throughout the period. The temperature is then maintained at 80° C. for the remainder of the batch. After 3400 parts of TFE have been added, the TFE feed and the agitator are stopped, and the polykettle is vented, evacuated, and purged with nitrogen. The length of the reaction is 95 min. The contents are cooled and discharged from the polykettle. The supernatant wax is removed. Solids content of the raw dispersion is 40 wt % and RDPS is 250 nm. The dispersion is diluted to 11% solids and coagulated in the presence of ammonium carbonate under vigorous agitation. The isolated PTFE resin is dried on a moving fabric as disclosed in U.S. Pat. No. 5,391,709 using air heated to a temperature of about 180° C. Results are summarized in Table 1. Break strength is high and creep rate is low.

What is claimed is:

1. A stretchable, fibrillatable, non-melt-fabricable polytetrafluoroethylene resin having standard specific gravity of no more than 2.160, rheometer pressure of at least 25 MPa, stress relaxation time of at least 650 seconds, and break strength of at least 3.0 kilogram force.

2. The polytetrafluoroethylene resin of claim 1, wherein said resin has creep rate at 365° C. of no more than 0.1 min$^{-1}$.

3. The polytetrafluoroethylene resin of claim 1, wherein said break strength is at least 3.1 kgf.

4. The polytetrafluoroethylene resin of claim 1, wherein said creep rate is no more than 0.08 min$^{-1}$.

5. The polytetrafluoroethylene resin of claim 1, wherein said creep rate is no more than 0.07 min$^{-1}$.

6. The polytetrafluoroethylene resin of claim 1, wherein said standard specific gravity is no more than 2.157.

7. The polytetrafluoroethylene resin of claim 1, wherein said rheometer pressure is at least 30 MPa.

8. The polytetrafluoroethylene resin of claim 1, wherein said resin is fine powder.

9. The polytetrafluoroethylene resin of claim 1, wherein said resin is the dispersed solid component of an aqueous dispersion.

* * * * *

UNITED STATES PATENT AND TRADEMARK OFFICE
CERTIFICATE OF CORRECTION

PATENT NO : U.S. 6,177,533 B1
DATED : January 23, 2001
INVENTOR(S) : Clay Woodward Jones It is certified that error appears in the above-identified patent and that said Letters Patent is hereby corrected as shown below:

ON THE COVER PAGE:

"(75) Inventor: Jones Clay Woodward, Washington, WV (US)" should appear

--(75) Inventor: Clay Woodward Jones, Washington, WV (US)--.

Signed and Sealed this

Twenty-ninth Day of May, 2001

Attest:

NICHOLAS P. GODICI

Attesting Officer

Acting Director of the United States Patent and Trademark Office